H. NAITO AND R. MURATA.
CAR TRUCK SHOCK ARRESTER OR SHOCK PREVENTING APPARATUS.
APPLICATION FILED JULY 3, 1917.

1,334,671.  Patented Mar. 23, 1920.

INVENTORS
H. Naito
R. Murata
BY Frank Fuller
ATTORNEY

UNITED STATES PATENT OFFICE.

HARUJIRO NAITO AND RINOSUKE MURATA, OF NAGOYA, JAPAN.

CAR-TRUCK SHOCK-ARRESTER OR SHOCK-PREVENTING APPARATUS.

1,334,671.    Specification of Letters Patent.    Patented Mar. 23, 1920.

Application filed July 3, 1917. Serial No. 178,507.

*To all whom it may concern:*

Be it known that we, HARUJIRO NAITO and RINOSUKE MURATA, both subjects of the Emperor of Japan, and residents of Nagoya city, Japan, have jointly invented new and useful Car-Truck Shock-Arrester or Shock-Preventing Apparatus, of which the following is a specification.

Our invention relates to new and useful improvements in car-truck shock arrester or shock preventing apparatus in which an arm is attached to both ends of a shaft arranged below the frame of a car truck, all the parts thereof being so arranged and constructed that the vertical motions of the car truck, caused by defects in the railroad track, while the same is running are made to take place fore and aft at the same time and uniformly.

An object of our invention is to provide a car-truck shock arrester or shock preventing apparatus simple in construction, cheap in cost of manufacture, and effective in operation.

Another object of our invention is to provide a car-truck shock arrester or shock preventing apparatus capable of keeping the car frame and the car body always in parallel to prevent the wave motions thereof and give more comfort to passengers.

A further object of our invention is to provide a car-truck shock arrester or shock preventing apparatus by means of which the life and usefulness of the car truck and the car body are prolonged, thus reducing the operating cost of the railroad industry.

Figure 1:
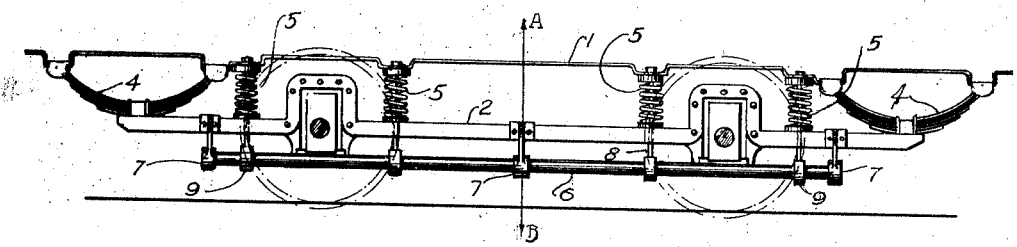
Figure 2:
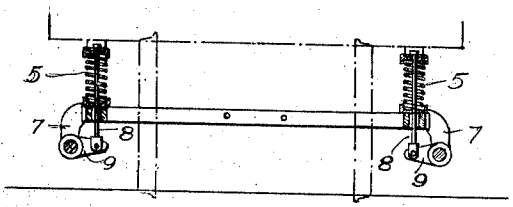
Figure 4:
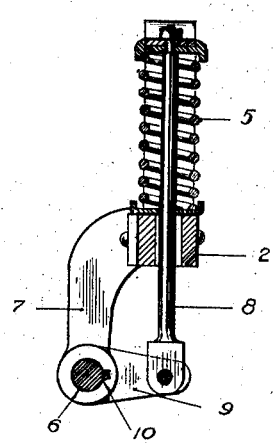
Figure 3:
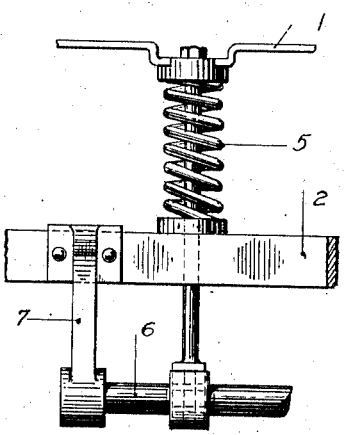

Other objects and advantages to be derived from the use of our invention will appear from the following detailed description and the claim, taken with an inspection of the accompanying drawing, in which:

Figure 1 is a side elevational view of the car truck; Fig. 2 is a front elevational view of the same; Fig. 3 is a magnified view of the principal parts shown in Fig. 1; and Fig. 4 is a sectional view of the same.

Similar numerals for reference designate like and corresponding parts throughout the several views.

Our present car-truck shock arrester or shock preventing apparatus is constructed by attaching the shaft brackets 7 to the car frame 2 and by arranging the shaft 6, to which the arms 9 are attached, thereon. Said shaft 6 and the arms 9 are solidly connected by means of the keys 10, and the shaft 6 and the shaft brackets 7 are made to move freely. And the springs 4 and 5 are arranged between the top chord 1 and the frame 2, and the top chord 1 and the arms 9 are connected by means of the rods 8.

With the car truck built hitherto, it is usual for the wheel provided either at the for or aft part of the car to descend along the track if said wheel passes over any part of the track which has caved in while running, and both the car frame and the car body descend suddenly with it, and the springs at that part of the car truck where said wheel is located alone receive excessive load with a consequence that said springs bend much more than the springs provided at the other part, thus increasing the wave motion of the car truck and the car body.

On the contrary, in our present invention all the parts are so arranged and constructed that, if any disproportioned or unbalanced load is added either to the fore or aft part (suppose the right side of the center line A B in Fig. 1 to be the fore part, and the left side the aft part) and the springs 4 and 5 at one part are bent, the rods 8, connecting the arms 9 with the top chord 1, are lowered to push said arms 9, and by the movement of the arms 9 the shaft 6 is rotated and transmits motions to the arms 9 provided at the other part and pulls the rods 8 connected therewith, thus bending the springs at said other part to the same extent as the springs at the first part. Thus, if any load is added either to the fore or aft part of the car truck, said load is balanced at the other part by the proper action of the arms 9, and the bending of the springs is properly adjusted, making it possible to keep the car truck and the car frame always in parallel and prevent the wave motions of the car body as well as the car truck to give stability and comfort to passengers. From the above detailed description it is thought that a thorough understanding may be had that our invention is very simple in construction, cheap in cost of manufacture, and exceedingly efficient in operation. We desire that it be understood that our invention is applicable not only to new steam and electric cars, but also to those used hitherto without any material inconvenience.

Having thus fully described our invention, what we claim as new and desire to secure by Letters Patent is:

A car-truck shock arrester of the class described, comprising shaft brackets attached to the frame, a shaft having arms attached thereto, keys solidly connecting the arms with the shaft, springs arranged between the top chord and the frame, and the rods connecting the arms with the top chord, all substantially as set forth.

In testimony whereof we affix our signatures hereto.

HARUJIRO NAITO.
RINOSUKE MURATA.